United States Patent Office 3,296,320

Patented Jan. 3, 1967

3,296,320
SELECTIVE HYDROGENATION OF TRANS, CIS-1,5-CYCLODECADIENE TO CIS-CYCLODECENE

Joseph T. Arrigo, Mount Prospect, Ill., assignor to Universal Oil Products Company, Des Plaines, Ill., a corporation of Delaware No Drawing. Filed Feb. 4, 1965, Ser. No. 430,498
8 Claims. (Cl. 260—666)

This invention relates to the preparation of cis-cyclodecene, a useful intermediate in the preparation of sebacic acid.

In one of its broad aspects, the present invention embodies a process for the preparation of cis-cyclodecene which comprises reacting hydrogen and trans,cis-1,5-cyclodecadiene under hydrogen pressure and at a temperature of from about 0° C. to about 75° C. in contact with a catalyst composite consisting of reduced nickel and an adsorbent carrier material selected from the group consisting of alumina, silica, and diatomaceous earth.

One of the more specific embodiments relates to a process for the preparation of cis-cyclodecene and comprises reacting hydrogen with trans,cis-1,5-cyclodecadiene at a hydrogen pressure of from about 350 p.s.i.g. to about 750 p.s.i.g. and at a temperature of from about 10° C. to about 60° C. in contact with a catalyst composite consisting of from about 50% to about 65% reduced nickel and diatomaceous earth.

Another of the more specific embodiments relates to a process for the preparation of cis-cyclodecene and comprises reacting hydrogen with trans,cis-1,5-cyclodecadiene at a hydrogen pressure of from about 350 p.s.i.g. to about 750 p.s.i.g. and at a temperature of from about 10° C. to about 60° C. in contact with a catalyst composite consisting of from about 10% to about 30% reduced nickel and alumina.

The trans,cis-1,5-cyclodecadiene selectively hydrogenated to form cis-cyclodecene in accordance with the process of this invention, is known in the art, being prepared, for example, by the cyclocooligomerization of two moles of butadiene with one mole of ethylene in the presence of a catalyst described as a $\pi$-allyl nickel complex. A description of the trans,cis-1,5-cyclodecadiene, as well as its preparation, is found in Angewandte Chemie International Edition, vol. 2, No. 3, page 105, March, and vol. 3, No. 10, page 702, October 1964.

When it is attempted to prepare cis-cyclodecene by hydrogenating trans,cis-1,5-cyclodecadiene, catalysts generally useful in the selective hydrogenation of other polyolefins are for the most part ineffective to attain any appreciable degree of selectivity. For example, when it is attempted to selectively hydrogenate trans,cis-1,5-cyclodecadiene using a palladium catalyst, a major portion of said cyclodecadiene tends to isomerize to a cyclodecadiene tentatively identified as cis,cis-1,6-cyclodecadiene which has proved to be extremely difficult to hydrogenate selectively to the desired cis-cyclodecene. Somewhat the same results are obtained with a rhodium catalyst. Ruthenium appears to be overly active, converting a major portion of the cyclodecadiene to the fully saturated cyclodecane. On the other hand, the nickel catalyst of this invention shows a surprising degree of selectivity not anticipated in view of experience with the other described catalysts.

The catalyst of this invention comprises reduced nickel composited with an inert adsorbent carrier material selected from the group consisting of alumina, silica and certain naturally occurring siliceous materials described as diatomaceous earth. Diatomaceous earth is intended as descriptive of the related adsorbent materials which are predominantly siliceous in character and commonly referred to as siliceous earth, diatomaceous silica, kieselguhr, ceyssatite, tripolite, and the like.

The catalyst composite may comprise from about 10% to about 80% reduced nickel. The nickel can be composited with the selected adsorbent carrier material in any conventional or otherwise convenient manner. For example, the adsorbent carrier material can be soaked, dipped, suspended or otherwise immersed in an aqueous solution of a suitable nickel salt such as an aqueous solution of nickel chloride, nickel nitrate, nickel sulfate, nickel formate, nickel acetate, etc. The resulting composite is dried and thereafter calcined in a suitable reducing atmosphere, such as hydrogen, at a temperature of from about 300° C. to about 1200° C. A preferred method of compositing reduced nickel with kieselguhr comprises suspending the kieselguhr in an aqueous solution of nickel sulfate and adding a hot saturated solution of sodium carbonate thereto slowly and with agitation. The liquid is then decanted to leave the kieselguhr with precipitated nickel carbonate composited therewith. The product is dried and subjected to temperatures of about 300° C. thereby eliminating carbon dioxide and leaving nickel oxide composited with the kieselguhr. The nickel oxide-kieselguhr composite is then subjected to a temperature of from about 300° C. to about 1200° C. in a hydrogen atmosphere or other suitable reducing atmosphere. The material is generally utilized in a pelleted form although this particular shape is not essential to the process of this invention. A catalyst composite consisting of reduced nickel and kieselguhr preferably comprises from about 50% to about 65% reduced nickel, while a catalyst composite consisting of reduced nickel and alumina preferably comprises from about 10% to about 30% reduced nickel.

The selective hydrogenation of the trans,cis-1,5-cyclodecadiene can be suitably effected within a period of from about 1 to about 48 hours at a temperature of from about 0° C. to about 75° C., the rate of hydrogenation decreasing with decreasing temperature. Selectivity drops off somewhat with increasing temperature, but it is substantially unaffected within the preferred temperature range of from about 10° C. to about 60° C. Although it is desired to hydrogenate only one of two double bonds, selectively is not impaired in the presence of excess hydrogen. The process is suitably carried out at a hydrogen pressure of from about 30 p.s.i.g. to about 1500 p.s.i.g., a hydrogen pressure in the range of from about 350 p.s.i.g. to about 750 p.s.i.g. being preferred.

The process of this invention can be effected batchwise or in a continuous flow type of operation. For example, a high pressure reaction vessel such as an autoclave designed for the introduction of hydrogen and equipped with temperature control means can be employed. The pulversized catalyst is placed in the autoclave together with the cyclodecadiene charge. It is preferable to include an inert solvent in a substantial amount to aid in the dissipation of the heat of reaction. Cyclohexane is a suitable solvent, as are paraffins and benzene or other aromatic hydrocarbons, the latter being substantially inert to hydrogenation at reaction conditions herein employed. The autoclave is flushed one or more times with dry nitrogen and then pressured to the desired initial pressure with hydrogen. Since hydrogen is consumed in the reaction, its progress can be ascertained with reference to pressure although it may be desired to maintain a constant pressure by the continuous or intermittent addition of hydrogen to the reaction vessel. On completion of an adequate residence time at reaction conditions, the autoclave is vented and the liquid contents filtered from the catalyst. It is preferable to carry the reaction to completion, i.e., to effect about 100% conversion of the trans,cis-1,5-cyclodecadiene starting material. The reaction product is then stable at distillation conditions even at atmospheric pressure and is readily distilled in a nitrogen atmosphere to yield the cis-cyclodecene product.

The trans,cis-1,5-cyclodecadiene can be selectively hydrogenated to cis-cyclodecene in a continuous manner on a once-through basis. For example, the cyclodecadiene together with a substantially inert solvent, such as cyclohexane, is charged to a high pressure reaction chamber equipped with temperature control means and containing the catalyst disposed in a fixed bed therein. The reaction chamber is maintained at the desired pressure by means of hydrogen charged thereto either in a separate stream or commingled with the cyclodecadiene charge. The reactor effluent is recovered in a high pressure separator adequately cooled to insure separation of liquid and gaseous phases. The gaseous phase comprising hydrogen is recycled to the reaction chamber while the liquid phase is metered through a pressure reducing valve and passed to a distillation column for the separation of solvent and byproducts and recovery of cyclodecene.

The following examples are presented in illustration of the process of this invention and are not intended as an undue limitation on the generally broad scope of the invention as set out in the appended claims.

*Example I*

About 0.17 gram of pulverized catalyst consisting of reduced nickel on kieselguhr and comprising about 60% nickel was sealed in a high pressure glass reactor of 100 cubic centimeters capacity together with 3.4 grams of trans,cis-1,5-cyclodecadiene (97% pure) and 19.5 grams of cyclohexane. The reactor was immersed in a liquid bath and pressured to about 370 pounds per square inch gauge with hydrogen. The reaction mixture was stirred by means of a magnetic stirrer over a period of about 27 hours at a temperature of 20–32° C. Thereafter, the reactor was depressured and the liquid contents filtered from the catalyst. Gas-liquid chromatography of the liquid product indicated 100% conversion of the trans,cis-1,5-cyclodecadiene starting material. The reaction product contained 78% cis-cyclodecene, 17% of what has been tentatively identified as cis,cis-1,6-cyclodecadiene and 3% cyclodecane (on a cyclohexane-free basis).

*Example II*

About 0.17 gram of pulverized catalyst consisting of of reduced nickel on alumina and comprising about 25% nickel was sealed in a high pressure glass reactor of 100 cubic centimeters capacity together with 3.4 grams of trans,cis-1,5-cyclodecadiene (97% pure) and 19.5 grams of cyclohexane. The reactor was immersed in a liquid bath and pressured to about 375 pounds per square inch gauge with hydrogen. The reaction mixture was stirred by means of a magnetic stirrer over a period of about 17 hours at a temperature of 53–57° C. Thereafter, the reactor was depressured and the liquid contents filtered from the catalyst. Gas-liquid chromatography of the liquid product indicated 100% conversion of the trans-cis-1,5-cyclodecadiene starting material. Reaction product contained 72% cis-cyclodecene, 15% of what has been tentatively identified as cis,cis-1,6-cyclodecadiene and 9% cyclodecane (on a cyclohexane-free basis).

*Example III*

This example is presented in illustration of the contrasting results which have been obtained with other catalysts normally useful in the selective hydrogenation of other polyolefins. In this example, 0.17 gram of pulverized catalyst consisting of rhodium on alumina and comprising about 0.75% rhodium was sealed in a high pressure glass reactor of 100 cubic centimeters capacity together with 3.4 grams of trans,cis-1,5-cyclodecadiene (97% pure) and 19.5 grams of cyclohexane. The reactor was immersed in a liquid bath and pressured to about 370 pounds per square inch gauge with hydrogen. The reaction mixture was stirred by means of a magnetic stirrer over a period of about 3.5 hours at a temperature of 17–20° C. Thereafter, the reactor was depressured and the liquid contents decanted from the catalyst. Gas-liquid chromatography of the liquid product indicated 100% conversion of the trans,cis-1,5-cyclodecadiene starting material. Reaction product contained only 45% cis-cyclodecene with 44% being isomerized to what has been tentatively identified as cis,cis-1,6-cyclodecadiene and 7% being converted to cyclodecane (on a cyclohexane-free basis).

I claim as my invention:

1. A process for the preparation of cis-cyclodecene which comprises reacting hydrogen and trans,cis-1,5-cyclodecadiene under hydrogen pressure and at a temperature of from about 0° C. to about 75° C. in contact with a catalyst composite consisting of reduced nickel and an adsorbent carrier material selected from the group consisting of alumina, silica and diatomaceous earth.

2. A process for the preparation of cis-cyclodecene which comprises reacting hydrogen and trans,cis-1,5-cyclodecadiene under hydrogen pressure and at a temperature of from about 0° C. to about 75° C. on contact with a catalyst composite consisting of from about 10% to about 80% reduced nickel on an adsorbent carrier material selected from the group consisting of alumina, silica and diatomaceous earth.

3. A process for the preparation of cis-cyclodecene which comprises reacting hydrogen and trans,cis-1,5-cyclodecadiene under hydrogen pressure and at a temperature of from about 0° C. to about 75° C. in contact with a catalyst composite consisting of from about 10% to about 80% reduced nickel and diatomaceous earth.

4. A process for the preparation of cis-cyclodecene which comprises reacting hydrogen and trans,cis-1,5-cyclodecadiene under hydrogen pressure and at a temperature of from about 0° C. to about 75° C. in contact with a catalyst composite consisting of from about 10% to about 30% reduced nickel and alumina.

5. A process for the preparation of cis-cyclodecene which comprises reacting hydrogen and trans,cis-1,5-cyclodecadiene at a hydrogen pressure of from about 30 p.s.i.g. to about 1500 p.s.i.g. and at a temperature of from about 0° C. to about 75° C. in contact with a catalyst composite consisting of from about 10% to about 80% reduced nickel and diatomaceous earth.

6. A process for the preparation of cis-cyclodecene which comprises reacting hydrogen and trans,cis-1,5-cyclodecadiene at a hydrogen pressure of from about 30 p.s.i.g. to about 1500 p.s.i.g. and at a temperature of from about 0° C. to about 75° C. in contact with a catalyst composite consisting of from about 10% to about 30% reduced nickel and alumina.

7. A process for the preparation of cis-cyclodecene which comprises reacting hydrogen and trans,cis-1,5-cyclodecadiene at a hydrogen pressure of from about 350 p.s.i.g. to about 750 p.s.i.g. and at a temperature of from about 10° C. to about 60° C. in contact with a catalyst composite consisting of from about 50% to about 65% reduced nickel and diatomaceous earth.

8. A process for the preparation of cis-cyclodecene which comprises reacting hydrogen and trans,cis-1,5-cyclodecadiene at a hydrogen pressure of from about 350 p.s.i.g. to about 750 p.s.i.g. and at a temperature of from about 10° C. to about 60° C. in contact with a catalyst composite consisting of from about 10% to about 30% reduced nickel and alumina.

No references cited.

DELBERT E. GANTZ, *Primary Examiner.*

V. O'KEEFE, *Assistant Examiner.*